United States Patent [19]

Kommrusch

[11] Patent Number: 5,778,306
[45] Date of Patent: Jul. 7, 1998

[54] LOW LOSS HIGH FREQUENCY TRANSMITTING/RECEIVING SWITCHING MODULE

[75] Inventor: Richard S. Kommrusch, Albuquerque, N. Mex.

[73] Assignee: Motorola Inc., Schaumburg, Ill.

[21] Appl. No.: 745,345

[22] Filed: Nov. 8, 1996

[51] Int. Cl.$^6$ ........................................... H04B 1/44
[52] U.S. Cl. ........................... 455/78; 455/84; 333/101; 333/109
[58] Field of Search ........................ 333/109, 101; 455/73, 78, 80, 82, 83, 84, 550, 575, 129; 370/277, 278, 282

[56] References Cited

U.S. PATENT DOCUMENTS

| | | | |
|---|---|---|---|
| 4,602,227 | 7/1986 | Clark et al. | 333/101 |
| 4,701,724 | 10/1987 | Martin . | |
| 4,723,307 | 2/1988 | Clark et al. | 333/109 |
| 4,983,933 | 1/1991 | Volk et al. | 333/109 |
| 5,146,190 | 9/1992 | Firmain | 333/101 |
| 5,375,257 | 12/1994 | Lampen | 333/109 |
| 5,606,283 | 2/1997 | Allen et al. | 333/109 |

*Primary Examiner*—Nguyen Vo
*Attorney, Agent, or Firm*—Brian M. Mancini; Gary J. Cunningham

[57] ABSTRACT

A low loss high frequency transmitting/receiving switching module (100) having an input and output port (106,110), that individually may be connected to an antenna or external port (108,112) by applying an appropriate bias potential to a switching circuit (140). The switching circuit (140) is designed to operate with only a single diode (130). This is accomplished by using two, four-port 3 db directional couplers (102,104) connected with two coupling lines (114, 118). The switching diode (130) is used to add or delete a transmission line (142) in one of the coupling lines (118) to proved a signal phase shift. The switching circuit (140) switches in or out a 180 degree phase shift to change the phase relationship between signals in the two sets of coupling lines (114,116,118,120) to determine which ports (106,108,110,112) of the directional couplers (102,104) are interconnected.

25 Claims, 1 Drawing Sheet

LOW LOSS HIGH FREQUENCY TRANSMITTING/RECEIVING SWITCHING MODULE

FIELD OF THE INVENTION

The invention relates generally to the field of radio frequency switching circuits for use in communication devices, and particularly to a low loss high frequency transmitting/receiving switching module used in a transceiver.

BACKGROUND OF THE INVENTION

Transmitting/receiving switching modules have normally been used in communication systems wherein the transmit and receive signals share a common antenna. In more complicated systems it is necessary to provide an external port for testing the transmit and receive signals and for connecting an alternate antenna when in a vehicle. To facilitate a second antenna, circuitry is added to permit switching of the transmit/receive signals between the antenna and an external antenna port.

Typically, prior art radio transceivers use four switching diodes to interconnected the transmit or receive signal to either the antenna or the external port. A diode may be biased with a DC voltage to cause the diode to conduct, or by not applying a bias the diode appears to be electrically open. Bias voltages are applied to turn diodes on and off between the interconnected signal paths. In this way, for example, the transmitter leg of the circuit can be connected through to the antenna leg, or the external test port can be connected through to the receiver, all without mechanical switching.

In recent years, such electronic switching circuitry has been miniaturized using integrated multi-layer ceramic technology. However, the small size and proximity of components on a single module results in unexpected stray capacitances and subsequent signal loss. This signal loss degrades circuit and radiotelephone performance. Further, the addition of external ports adds stray capacitance and subsequent signal loss. In some radiotelephones it is desirable to have an external port for connecting an alternate antenna, such as a mobile antenna on a vehicle. As this type of functionality is added to these switching modules, and attempts are made to reduce stray capacitance, the size of the module has increased, defeating the original requirement of miniaturization.

In addition, the use of diodes in the switching circuitry of the radiotelephone increases current drain which, in turn, shortens battery life. Also, diodes add to the cost and complexity of a radiotelephone. Further, having a diode near to an antenna port tends to exacerbate second harmonic frequency problems in the radiotelephone.

It would be considered an improvement in the art to: reduce insertion loss of the switching circuitry, reduce the number of diodes in the switching circuit, minimize circuit size, and incorporate the functionality of an external port in the switching circuitry.

The need exists for a new switching module that can; reduce the insertion loss of the switching circuitry, minimize the number of components to improve spatial efficiency and reduce component interaction, and incorporate an external port circuit along with the required switching circuitry.

DETAILED DESCRIPTION OF THE PREFERRED EMBODIMENT

Figure 1:
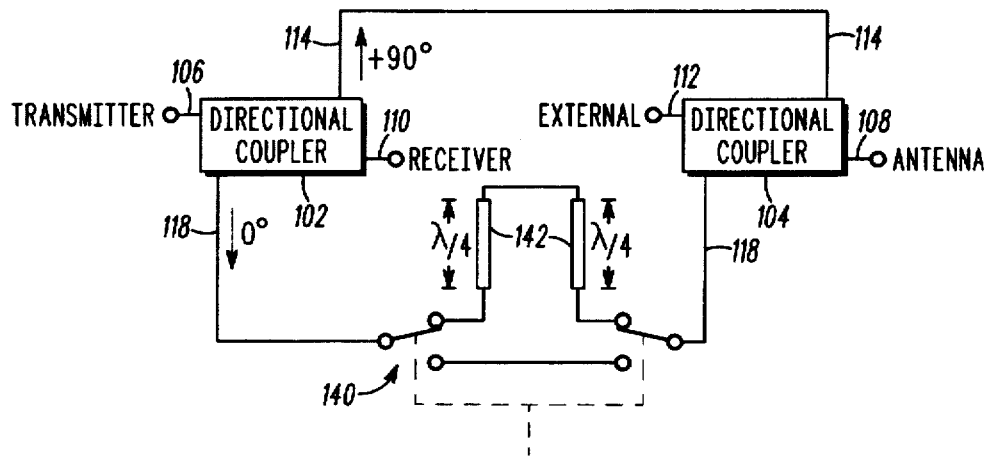
FIG. 1 shows one embodiment of an electrical circuit schematic diagram of a low loss high frequency transmitting/receiving switching module using directional couplers, in accordance with the present invention.

In FIG. 1, a low loss high frequency transmitting/receiving switching module 100 is shown. The switching module 100 includes: a first 3 db directional coupler 102 or 3 db hybrid junction, a second 3 db directional coupler 104 or 3 db hybrid junction, an input port 106 from a transmitter, an output port 110 to a receiver, an antenna port 108, an external port 112, and a switchably coupled delay circuit 140 having a total electrical length of about one-half wavelength and preferably consisting of at least one transmission line 142 or an equivalent lumped circuit having a total electrical length of about one-half wavelength. It is known in the art that directional couplers and hybrid junctions operate similarly and will work equally well in the present invention.

The transmitter and receiver are coupled to the first coupler 102 through the input and output ports 106,110, respectively. The external and antenna are coupled to the second coupler 104 through the external and antenna ports 112,108, respectively. The external port 108 advantageously provides a connection for an alternate antenna, or can be used as an I/O port for radio test equipment. The couplers 102,104 are electrically coupled by a first and a second coupling line 114, 118. In addition, the delay circuit 140 is switchably coupled in a series connection with the second coupling line 118.

The delay circuit 140 has an switched-out and switched-in mode and is used to respectively delete or add about one-half electrical wavelength to the second coupling line 118. With the delay circuit 140 switched-out, a switch closes to bypass the at least one transmission line 142 and directly connect and cause the second coupling line 118 to have a total electrical length substantially equal to the electrical length of the first coupling line 114. Alternatively, the coupling lines 114,118 may have unequal electrical lengths if they are substantially an integral number of wavelengths in difference or an integral number of one-half wavelengths. However, where a one-half wavelength of difference exists between the coupling lines 114,118, the connections will be transposed from those represented below.

With the delay circuit 140 switched-in, the switch is open causing the at least one transmission line 142 to be connected in series with the second coupling line 118 such that the second coupling line 118 has a total electrical length substantially one-half wavelength greater than the electrical length of the first coupling line 114. Changing the electrical length between signals changes their phase relationship. The phase relationship between signals is important for the proper operation of the couplers 102,104.

Typically, a 3 db directional coupler has four ports. Using the first coupler 102 of FIG. 1 as an example, any signal power input to the coupler 102 through ports 106 or 110 divides equally between lines 114 and 118 with the remaining port 110 or 106 remaining isolated. The subsequent signals on lines 114 and 118 will have a relative phase shift of 90°. For example, power entering port 106 would divide equally between lines 114 and 118 with substantially no signal leaving port 110. The resultant signal on line 114 will lead the resultant signal on line 118 by about 90° of phase. Conversely, if signal on line 114 lags the signal on line 118 by about 90° of phase their power will combine into a single signal leaving port 106 and no signal leaving port 110. Alternatively, if the signal on line 114 leads the signal on line 118 by about 90° of phase their power will combine into a single signal leaving port 110 and no signal leaving port 106. Both couplers 102 and 104 operate in this manner.

The switching module 100 may operate in one of four operational modes. These four modes interconnect the transmitter or receiver to the external port or antenna. In particular, the four connected modes are; input port (transmitter) to antenna, input port (transmitter) to external port, antenna to output port (receiver), and external port to output port (receiver). Advantageously, the properties of the directional couplers 102, 104 allow the four modes to occur with only the two switched positions of the delay circuit 140.

In the first operating mode, where the transmitter is connected to the antenna, the delay circuit 140 is switched-out, to bypass the at least one transmission line 142. A signal enters from the transmitter to the input port 106 of the first coupler 102. The coupler 102 divides the signal to provide two signals to the first and second coupling lines 114,118 that are equal in magnitude but about 90° out of phase with the signal in the first coupling line 114 leading the signal in the second coupling line 118 by about 90° of phase, with substantially no signal transmitted to the output port 110. The signals in the first and second coupling lines 114,118 travel a substantially equal electrical length to the second coupler 104. Because the signal entering the second coupler 104 from the first coupling line 114 leads the signal entering the second coupler 104 from the second coupling line 118 by about 90° of phase the signals combine into a single signal coupled at the antenna port 108 with substantially no signal coming out of the external port 112.

In the second operating mode, where the transmitter is connected to the external port, the delay circuit 140 is switched-in, connecting the at least one transmission line 142 in a series connection with the second coupling line 118. A signal enters from the transmitter to the input port 106 of the first coupler 102. The coupler 102 divides the signal to provide two signals to the first and second coupling lines 114,118 that are about equal in magnitude but about 90° out of phase with the signal in the first coupling line 114 leading the signal in the second coupling line 118 by about 90° of phase, with substantially no signal transmitted to the output port 110. The signal in the second coupling line 118 travels about an extra one-half electrical wavelength through the at least one transmission line 142 than the signal in the first coupling line 114. As the signals enter the second coupler 104 they are now effectively reversed in phase with the signal in the second coupling line 118 leading the signal in the first coupling line 114 by about 90° of phase. Because the signals entering the second coupler 104 are substantially reversed in phase, with the signal in the second coupling line 118 now leading the signal in the first coupling line 114 by about 90° of phase, the signals combine into a single signal coupled at the external port 112 with substantially no signal coming out of the antenna port 108.

In the third operating mode, where the antenna is connected to the receiver, the delay circuit 140 is switched-in, connecting the at least one transmission line 142 in a series connection with the second coupling line 118. A signal enters from the antenna port 108 to the second coupler 104. The coupler 104 divides the signal to provide two signals to the first and second coupling lines 114,118 that are about equal in magnitude but with the signal in the second coupling line 118 leading the signal in the first coupling line 114 by about 90° of phase, with substantially no signal transmitted to the external port 112. The signal in the second coupling line 118 travels about an extra one-half wavelength to the first coupler 102 than the signal in the first coupling line 114. Because the signals entering the first coupler 102 are substantially reversed in phase, with the signal in the first coupling line 114 now leading the signal in the second coupling line 118 by about 90° of phase, the signals combine into a single signal coupled at the output port 110 to the receiver with substantially no signal coming out of the input port 106.

In the fourth operating mode, where the external port is connected to the receiver, the delay circuit 140 is switched-out, to bypass the at least one transmission line 142. A signal enters from the external port 112 to the second coupler 104. The coupler 104 divides the signal to provide two signals to the first and second coupling lines 114,118 that are about equal in magnitude but with the signal in the first coupling line 114 leading the signal in the second coupling line 118 by about 90° of phase, with substantially no signal transmitted to the antenna port 108. The signals in the first and second coupling lines 114,118 travel about an equal electrical length to the first coupler 102. Because the signal entering the first coupler 102 from the first coupling line 114 leads the signal entering the first coupler 102 from the second coupling line 118 by about 90° of phase the signals combine into a single signal coupled at the output port 110 to the receiver with substantially no signal coming out of the input port 106 to the transmitter.

Figure 2:
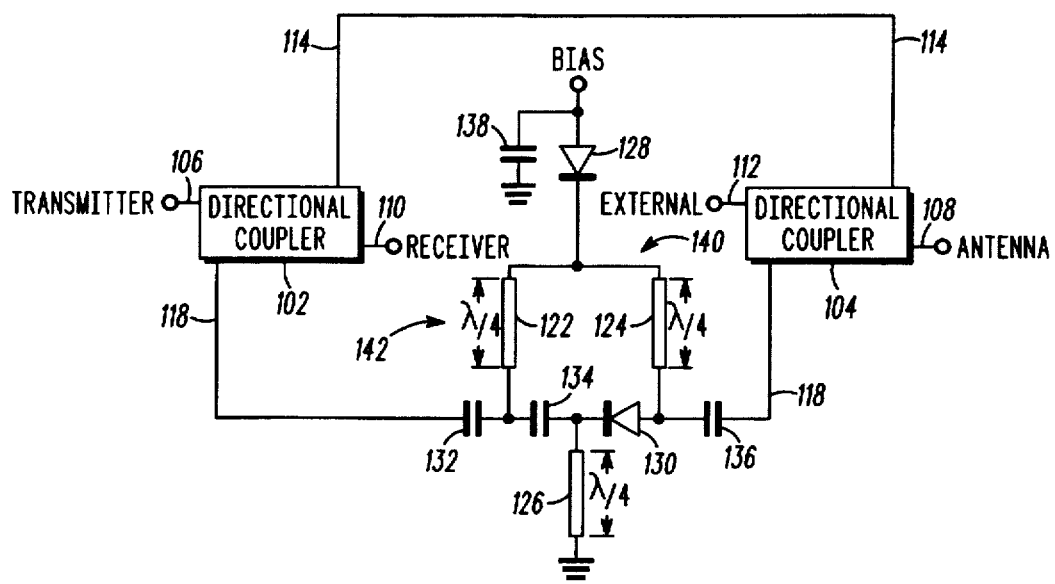
FIG. 2 shows a preferred embodiment of the switching module of FIG. 1 utilizing a diode based switching circuit, in accordance with the present invention.

In a preferred embodiment, as shown in FIG. 2, the delay circuit 140 includes a diode 130, a first, second and third DC blocking capacitor 132,134,136, a biasing element 128 and a RF choke 126, and the at least one transmission line 142 includes a first and second transmission line 122,124 connected in series and having an electrical length of about one-quarter wavelength each. The diode 130 is connected in a series combination with the second DC blocking capacitor 134. The series combination is further connected in series with the second coupling line 118 via the first and third DC blocking capacitors 132,136. The first and second transmission lines 122,124 are connected in parallel across the series combination of the diode 130 and second blocking capacitor 134. The RF choke 126 is connected at a junction of the second blocking capacitor 134 and the diode 130. The biasing element 128 is connected at a junction of the first and second transmission lines 122,124.

The delay circuit 140 can be thought of as two circuits; an AC or RF signal circuit and a DC or Bias circuit. The circuits share a common ground but are isolated from each other with blocking capacitors 132, 134, 136, the biasing element 128 and the RF choke 126. The blocking capacitors 132 and 136 keep a DC bias off of the second coupling line 118. Blocking capacitor 134 prevents the DC bias from going directly to ground through the RF choke 126 and forces it to go through the diode 130. When a DC bias potential is applied, the diode 130 presents a very low resistance, essentially a short circuit, to a RF signal. When no bias is applied, the diode 130 appears as very small capacitance to the RF signal and is essentially open. The RF signal can take one of two paths depending on the bias state of the diode 130. The biasing element 128 may consist of a diode or a transmission line, either of which may include a shunt capacitor when the biasing element is not connected to ground. In this case, the shunt capacitor shorts RF signals to ground prevent leakage into the power supply. The RF choke 126 may consist of a substantially one-quarter wavelength transmission line or an inductor, either of which may include a shunt capacitor when the RF choke is not connected to ground. In this case, the shunt capacitor shorts RF signals to ground prevent leakage into the power supply. In a preferred embodiment, the biasing element 128 is a biasing diode connected to be forward biased when the diode 130 is forward biased and reverse biased when the diode 130 is reverse biased. Also, the RF choke 126 is preferably a substantially one-quarter wavelength transmission line. The RF signal is not effected by a one-quarterwave line that is shorted at its far end such as the RF choke 126, because the short reflects an electrical open to the second coupling line 118 one-quarter wavelength away.

The series combination of the diode 130 and second blocking capacitor 134 may be configured in one of four ways, depending on the biasing scheme used. Each configuration will work equally well. First, if a positive bias is to be applied to the biasing element 128 with respect to the RF choke 126, the diode 130 needs to be connected in a forward bias from the biasing element 128 towards the RF choke 126. This is accomplished by connecting a cathode of the diode 130 at a junction of the second blocking capacitor 134 and the RF choke 126. Further, in this configuration, the diode 130 may be coupled either between the first and second blocking capacitors 132,134 or between the second and third blocking capacitors 134,136, as is shown in FIG. 2. Second, if a negative bias is to be applied to the biasing element 128 with respect to the RF choke 126, the diode 130 needs to be connected in a forward bias from the RF choke 126 towards the biasing element 128. This is accomplished by connecting an anode of the diode 130 at a junction of the second blocking capacitor 134 and the RF choke 126. Further, in this configuration the diode 130 may be coupled either between the first and second blocking capacitors 132,134 or between the second and third blocking capacitors 134,136, as shown in FIG. 2.

Although the configuration of the diode 130 is not relevant when the delay circuit 140 is switched-out (the diode 130 is unbiased), the configuration is relevant to determine what type of bias potential should be applied to switch-in the delay circuit 140. Where the cathode of the diode 130 is connected at the junction of the second blocking capacitor 134 and the RF choke 126 it is necessary to apply a positive bias potential to the biasing element 128 relative to the RF choke 126. This may be accomplished by applying a positive voltage to the biasing element 128 and grounding or applying a negative bias to the RF choke 126, or by grounding the biasing element 128 and applying a negative voltage to the RF choke 126. Where the anode of the diode 130 is connected at the junction of the second blocking capacitor 134 and the RF choke 126 it is necessary to apply a negative bias potential to the biasing element 128 relative to the RF choke 126. This may be accomplished by applying a negative voltage to the biasing element 128 and grounding or applying a positive bias to the RF choke 126, or by grounding the biasing element 128 and applying a positive voltage to the RF choke 126. In either case, wherever a positive or negative voltage is applied, it is good practice to connect a shunt capacitor to ground to prevent RF signals from leaking into the bias supply. Preferably, where a biasing potential is applied to the biasing element 128 to cause it to conduct, the biasing diode 128 shorts the transmission lines 122,124 to ground through a shunt capacitor 138 connected at a bias point. In addition, where the transmission lines 122,124 join the second coupling line 118, one-quarter wavelength away, the transmission lines 122,124 appear as electrical opens.

In a preferred embodiment, an anode of the diode 130 is coupled to the first directional coupler 102 through the first and second DC blocking capacitor 132,134 and the second coupling line 118. A cathode of the diode 130 is coupled to the second coupler 104 through a third DC blocking capacitor 136 and the second coupling line 118. The diode 130 provides the switching action for the delay circuit 140. The transmission lines 122,124 are connected in series between the junction of the first and second blocking capacitors 132,134 and the junction of the diode 130 and the third blocking capacitor 136. The biasing element 128 is a biasing diode connected to be forward biased when the diode 130 is forward biased. In particular, a cathode of the biasing diode is connected at the junction of the two transmission lines 122,124. Further, the biasing diode is terminated with the shunt capacitor 138 at a bias point to provide an RF ground.

The RF choke 126 is preferably a one-quarter wavelength transmission line choke because, where the one-quarter wavelength transmission line is electrically shorted at one end, the opposite end appears to be an electrically open AC circuit while still providing a DC path to ground. Therefore, because the transmission line choke has one end grounded, the opposite end (coupled to the diode 130) appears as an electrically open circuit and substantially no signal from the second coupling line 118 flows through the RF choke 126 to ground.

In a preferred embodiment, the switching action of the delay circuit 140 is provided by applying a positive DC bias potential to a bias point to make the diodes 128,130 conduct, or removing the DC bias to make the diodes 128,130 appear electrically open. To switch-out the delay circuit 140, a positive bias potential is applied to the biasing element 128 relative to the RF choke 126 such that a DC bias current flows to ground or negative bias through the biasing element 128, second transmission line 124, diode 130, and RF choke 126. This DC bias current switches the diode 130 into a conducting state. The first and third blocking capacitors 132,136 prevent the DC bias current from leaking out of the delay circuit 140. The second blocking capacitor 134 prevents a secondary DC path through the first transmission line 122 to ground or negative bias. The DC blocking capacitors 132,134,136 along with the conducting diode 130 provide AC coupling in series with the second coupling line 118 effectively bypassing or switching-out the transmission lines 122,124. AC signals are prevented from being lost in the biasing circuit by the transmission lines 122,124 and RF choke 126 each being terminated by a short and appearing open to the second coupling line 118.

To switch-in the delay circuit 140, the DC bias potential is removed from the biasing element 128. This substantially stops the DC bias current and switches the diode 130 into a substantially nonconducting state. In this state, the diode 130 appears electrically open. The DC blocking capacitors 132, 136 provide AC coupling with the second coupling line 118 through the transmission lines 122,124, thereby adding one-half wavelength to the signal path. AC signals are prevented from entering the RF choke 126 which is terminated by a short and appears open to the second coupling line 118.

It should be noted that the arrangement, number, and positions of the DC blocking capacitors 132,134,136 could be changed to several different equally suitable configurations. In a first embodiment, where the diode 130 is connected to the second transmission line 124, the original position of the first blocking capacitor 132 is shorted and the first blocking capacitor 132 is inserted in series with the first transmission line 122. This provides an alternate way to block DC bias current from reaching the diode 130 or first coupler 102. In a second embodiment, where the diode 130 is connected to the first transmission line 122, the original position of the third blocking capacitor 136 is shorted and the third blocking capacitor 136 is inserted in series with the second transmission line 124. This provides an alternate way to block DC bias current from reaching the diode 130 or second coupler 104. In a third embodiment, where the diode 130 is connected to the second transmission line 124, the original position of the second blocking capacitor 134 is shorted and the second blocking capacitor 134 is inserted in series with the first transmission line 122. This provides an alternate way to block DC bias current from reaching the diode 130 or first coupler 102. In a fourth embodiment, where the diode 130 is connected to the first transmission line 122, the original position of the second blocking capacitor 134 is shorted and the second blocking capacitor 134 is inserted in series with the second transmission line 124. This provides an alternate way to block DC bias current from reaching the diode 130 or second coupler 104. In a fifth embodiment, at least one of the respective first and third blocking capacitors 132,136 are shorted and blocking of a DC bias signal from the delay circuit 140 is provided outside of the switching module 100 in at least one of the corresponding antenna and receiver. The second coupling line 118 has a DC connection with the antenna port 108 to an antenna and the output port 110 to a receiver. Therefore, the first or third blocking capacitors 132,136 are not needed if DC blocking is provided outside of the switching module 100.

It should be recognized that the second DC blocking capacitor 134 has an associated stray capacitance which effectively lengthens the transmission line choke 126. In a preferred embodiment, it is advantageous to shorten the transmission line choke 126 to a predetermined length to account for the stray capacitance, and to provide a substantially equivalent one-quarter wavelength transmission line. Preferably, the characteristic impedance of the transmission lines 122,124, 126 is selected to be from about 25 to 75 ohms. This has the advantage of substantially optimizing both coupling and decoupling of transmitted signals.

In addition, it should be recognized that in another embodiment of the switching module 100, the transmitting and receiving functions may be interchanged as well as the antenna and external functions. However, in a preferred embodiment the delay circuit is left unbiased. This has the advantage of reducing current drain on the radiotelephone in normal operation since diodes cause voltage drops and signal losses. Further, it should be recognized that the directional couplers 102,104 could be designed to function as transmission line harmonic filters when coupled with stray capacitances within the switching module 100.

In a preferred embodiment, the switching module 100 is disposed on a plurality of ceramic layers defining a single ceramic block device. This has the advantage of; miniaturization, ease of manufacturability, reduced parts count, low cost, being self-shielded, minimizing interference that would exist with discrete components, and having low insertion loss.

The advantage of using the directional couplers 102,104 is that the switching module 100 can operate properly with less than the traditional four diodes. This reduces circuit insertion loss in a radio. The use of less than four switching diodes for the switching module 100 has several advantages. First, it lessens current drain in a radiotelephone which increases battery life. Also, a lesser number of diodes reduces the cost, size and complexity of a radiotelephone. Further, there are no diodes near the antenna port which helps alleviate second harmonic frequency problems in the radiotelephone. In addition, the use of less than four switching diodes improves the insertion loss of the switching circuitry while incorporating the functionality of an external port in the switching circuitry.

Figure 3:
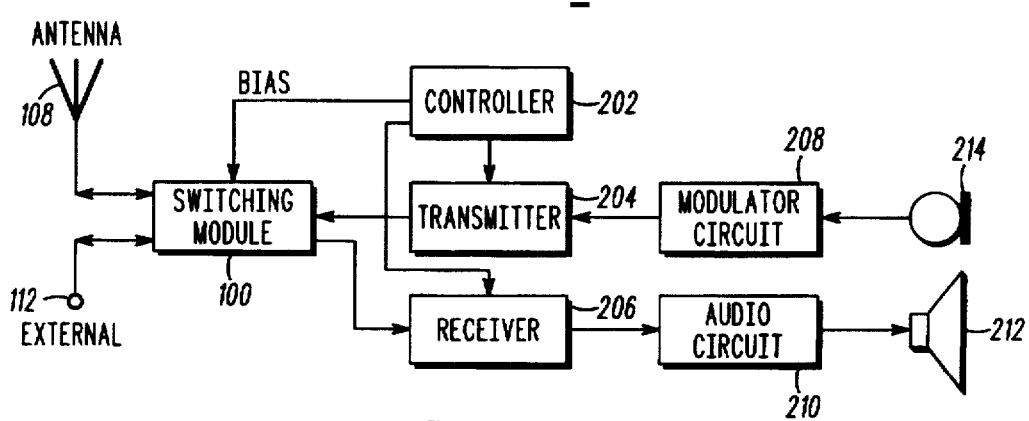
FIG. 3 shows a block diagram of a communication device, in accordance with the present invention.

FIG. 3 shows a block diagram of a communication device, in accordance with the present invention. In a preferred embodiment, the communication device is a transceiver 200. The transceiver 200 includes a microphone 214, a speaker 212, a modulator circuit 208, an audio circuit 210, a controller 202, a transmitter 204, a receiver 206 and the switching module 100 with an antenna port 108 and an external port 112. The controller 202 is connected to, and controls, the transmitter 204, receiver 206, modulator circuits 208 and the switching module 100.

For the communication device to transmit signals, the microphone 214 converts acoustic signals to electrical signals which are coupled to the modulator circuit 208. The modulator circuit 208 connects the signals to the switching module 100 through the transmitter 204. When the controller 202 supplies a bias signal to the switching module 100, the signal is coupled through the switching module 100 to the antenna port 108. Alternatively, if no bias is applied, the signal is coupled through the switching module 100 to the external port 112.

For the communication device to receive a signal, if no bias is applied to the switching module 100, a signal generated in the antenna port 108 is coupled through the switching module 100 to the receiver 206. Alternatively, if a bias is applied to the switching module 100, a signal generated in the external port 112 is coupled through the switching module 100 to the receiver 206. The receiver 206 demodulates the signal in conjunction with the audio circuit 210 to produce an audio signal which is connected to the speaker 212.

Although various embodiments of this invention have been shown and described, it should be understood that various modifications and substitutions, as well as rearrangements and combinations of the preceding embodiments, can be made by those skilled in the art, without departing from the novel spirit and scope of this invention.

What is claimed is:

1. A transmitting/receiving switching module, comprising:

a first and second directional coupler, the first directional coupler having an input and output port, the second directional coupler having an antenna and external port;

a delay circuit having an electrical length of about one-half wavelength;

a first coupling line electrically connecting the couplers, a second coupling line electrically connecting the couplers, the delay circuit being switchably coupled in series with the second coupling line; and a switching circuit including a diode, a first, second and third DC blocking capacitor, a biasing element and a RF choke, the diode is connected in a series combination with the second DC blocking capacitor, the series combination is further connected in series with the second coupling line via the first and third DC blocking capacitors, the delay circuit is connected in parallel across the series combination, the RF choke is connected at a junction of the second blocking capacitor and the diode, the biasing element is coupled to the delay circuit;

the delay circuit, when switched into a series connection with the second coupling line by the switching circuit, adding substantially one-half electrical wavelength to the second coupling line, the delay circuit, when switched out of the series connection with the second coupling line by the switching circuit, subtracting substantially one-half electrical wavelength from the second coupling line.

2. The switching module of claim 1, wherein the first coupling line has an integral number of substantially one-half wavelengths of electrical length different from an electrical length of the second coupling line.

3. The switching module of claim 1, wherein the first and second coupling lines have a substantially equal electrical length.

4. The switching module of claim 1, wherein the delay circuit is selected from the group consisting of two substantially one-quarter wavelength transmission lines and a lumped circuit having an total electrical length of about one-half wavelength.

5. The switching module of claim 1, wherein at least one of the couplers, delay circuit, switching circuit and coupling lines are disposed upon at least one ceramic substrate.

6. The switching module of claim 1, wherein at least one of the couplers, delay circuit, switching circuit and coupling lines are substantially buried within at least one ceramic substrate.

7. The switching module of claim 1, wherein the delay circuit comprises two substantially one-quarter wavelength transmission lines having a characteristic impedance of about 25 to 75 ohms.

8. The switching module of claim 1, wherein the RF choke is selecting from the group consisting of a substantially one-quarter wavelength transmission line, a substantially one-quarter wavelength transmission line coupled with a shunt capacitor, an inductor, and an inductor coupled with a shunt capacitor.

9. The switching module of claim 1, wherein the biasing element is selected from the group consisting of a transmission line, a transmission line connected coupled with a shunt capacitor, a biasing diode being connected to be forward biased when the diode is forward biased, and a biasing diode connected coupled with a shunt capacitor and being connected to be forward biased when the diode is forward biased.

10. The switching module of claim 1, wherein a cathode of the diode is connected to the RF choke, and wherein when a positive bias potential is applied to the biasing element relative to the RF choke a DC bias current flows through the biasing element, the transmission line connected to the diode, the diode, and the RF choke, the DC bias current switching the diode into a conducting state thereby switching-out the delay circuit, the first and third blocking capacitors preventing the DC bias current from leaking from the delay circuit, the second blocking capacitor preventing a secondary DC path, the DC blocking capacitors and the conducting diode providing AC coupling to the second coupling line, effectively bypassing the first and second transmission lines.

11. The switching module of claim 10, wherein the second blocking capacitor is shorted and a fourth capacitor is connected in series with the transmission line that is not connected to the diode, the fourth capacitor preventing a secondary DC path when the delay circuit is biased.

12. The switching module of claim 10, wherein:
when the diode is connected to the third blocking capacitor the first blocking capacitor is shorted and a fourth capacitor is connected in series with the transmission line that is not connected to the diode, the fourth capacitor preventing a secondary DC path when the delay circuit is biased, and when the diode is connected to the first blocking capacitor the third blocking capacitor is shorted and a fourth capacitor is connected in series with the transmission line that is not connected to the diode, the fourth capacitor preventing a secondary DC path when the delay circuit is biased.

13. The switching module of claim 1, wherein when no bias potential is applied to the biasing element substantially minimal DC bias current flows such that the diode is in a substantially nonconducting state thereby switching-in the delay circuit, the first and third DC blocking capacitors AC coupling the first and second transmission lines in series with the second coupling line, thereby adding about a one-half electrical wavelength to the second coupling line.

14. The switching module of claim 1, wherein an anode of the diode is connected to the RF choke, and wherein when a negative bias potential is applied to the biasing element relative to the RF choke a DC bias current flows through the RF choke, the diode, the transmission line connected to the diode, and the biasing element, the DC bias current switching the diode into a conducting state thereby switching-out the delay circuit, the first and third DC blocking capacitors preventing the DC bias current from leaking from the switching circuit, the second blocking capacitor preventing a secondary DC path, the DC blocking capacitors and the conducting diode providing AC coupling to the second coupling line, effectively bypassing the first and second transmission lines.

15. The switching module of claim 1, further comprising four operating modes:

a first operating mode, wherein a signal from the input port is coupled to the antenna port, the first operating mode including the delay circuit being switched-out bypassing the delay circuit, a signal subsequently entering from the input port to the first coupler being divided by the first coupler to provide two signals to the first and second coupling lines with substantially no signal transmitted to the output port, the signals being substantially equal in magnitude and about 90° out of phase with the signal in the first coupling line leading the signal in the second coupling line by about 90° of phase, the signals in the first and second coupling lines traveling a substantially equal electrical length to the second coupler, the signal entering the second coupler from the first coupling line leading the signal entering the second coupler from the second coupling line by about 90° of phase such that the signals combine into a single signal coupled at the antenna port with substantially no signal present at the external port;

a second operating mode, wherein a signal from the input port is connected to the external port, the second operating mode including the delay circuit being switched-in to connect the delay circuit in a series connection with the second coupling line, a signal subsequently entering from the input port to first coupler being divided by the first coupler to provide two signals to the first and second coupling lines with substantially no signal transmitted to the output port, the signals leaving the first coupler being substantially equal in magnitude and about 90° out of phase with the signal in the first coupling line leading the signal in the second coupling line by about 90° of phase, the signal in the second coupling line traveling about an extra one-half wavelength through the at least one transmission line than the signal in the first coupling line, the signals entering the second coupler, being effectively reversed in phase with the signal in the second coupling line leading the signal in the first coupling line by about 90° of phase such that the signals combine into a single signal coupled at the external port with substantially no signal coming out of the antenna port;

a third operating mode, wherein a signal from the antenna port is connected to the output port, the third operating mode including the delay circuit being switched-in to connect the delay circuit in a series connection with the second coupling line, a signal subsequently entering from the antenna port to the second coupler being divided by the second coupler to provide two signals to the first and second coupling lines with substantially no signal transmitted to the external port, the signals leaving the second coupler being substantially equal in magnitude and about 90° out of phase with the signal in the second coupling line leading the signal in the first coupling line by about 90° of phase, the signal in the second coupling line traveling about an extra one-half wavelength through the at least one transmission line than the signal in the first coupling line, the signals entering the first coupler, being substantially reversed in phase with the signal in the first coupling line now leading the signal in the second coupling line by 90°, combine into a single signal coupled at the output port with substantially no signal coming out of the input port; and a fourth operating mode, wherein a signal from the external port is coupled to the output port, the fourth operating mode including the delay circuit being switched-out and bypassing the delay circuit, a signal subsequently entering from the external port to the second coupler being divided by the second coupler to provide two signals to the first and second coupling lines with substantially no signal transmitted to the antenna port, the signals being substantially equal in magnitude and about 90° out of phase with the signal in the first coupling line leading the signal in the second coupling line by about 90° of phase, the signals in the first and second coupling lines traveling a substantially equal electrical length to the first coupler, the signal entering the first coupler from the first coupling line leading the signal entering the first coupler from the second coupling line by about 90° of phase such that the signals combine into a single signal coupled at the output port with substantially no signal present at the input port.

16. A transmitting/receiving switching module, comprising:

a first and second hybrid junction, the first hybrid junction having an input and output port, the second hybrid junction having an antenna and external port;

a delay circuit having an electrical length of about one-half wavelength;

a first coupling line electrically connecting the junctions, a second coupling line electrically connecting the junctions, the delay circuit being switchably coupled in series with the second coupling line; and a switching circuit including a diode, a first, second and third DC blocking capacitor, a biasing element and a RF choke, the diode is connected in a series combination with the second DC blocking capacitor, the series combination is further connected in series with the second coupling line via the first and third DC blocking capacitors, the delay circuit is connected in parallel across the series combination, the RF choke is connected at a junction of the second blocking capacitor and the diode, the biasing element is coupled to the delay circuit;

the delay circuit, when switched into a series connection with the second coupling line by the switching circuit, adding substantially one-half electrical wavelength to the second coupling line, the delay circuit, when switched out of the series connection with the second coupling line by the switching circuit, subtracting substantially one-half electrical wavelength from the second coupling line.

17. A transmitting/receiving switching module, comprising:

a first and second directional coupler, the first directional coupler having an input and output port, the second directional coupler having an antenna and external port;

a first and second transmission line being connected in series, the first and second transmission lines having a total electrical length of about one-half wavelength; and a first coupling line electrically connecting the couplers, a second coupling line electrically connecting the couplers, the first and second transmission lines being switchably coupled in series with the second coupling line;

the first and second transmission lines, when switched into a series connection with the second coupling line, adding substantially one-half electrical wavelength to the second coupling line, the first and second transmission lines, when switched out of the series connection with the second coupling line, subtracting substantially one-half electrical wavelength from the second coupling line; and a diode, a first, second and third DC blocking capacitor, a biasing element and a RF choke, the diode being connected in a series combination with the second DC blocking capacitor, the series combination is further connected in series with the second coupling line via the first and third DC blocking capacitors, the first and second transmission lines being connected in parallel across the series combination, the RF choke being connected at a junction of the second blocking capacitor and the diode, the biasing element being connected at a junction of the first and second transmission lines.

18. The switching module of claim 17, wherein the RF choke is selecting from the group consisting of a substantially one-quarter wavelength transmission line, a substantially one-quarter wavelength transmission line with a shunt capacitor, an inductor, and an inductor with a shunt capacitor, and wherein the biasing element is selected from the group consisting of a transmission line, a transmission line connected with a shunt capacitor, a biasing diode being connected to be forward biased when the diode is forward biased, and a biasing diode connected with a shunt capacitor and being connected to be forward biased when the diode is forward biased.

19. The switching module of claim 17, further comprising a switched-out mode of the transmission lines including one of:

a cathode of the diode being connected to the RF choke and a positive bias potential being applied to the biasing element relative to the RF choke such that a DC bias current flows through the biasing element, the transmission line connected to the diode, the diode, and the RF choke, the DC bias current switching the diode into a conducting state switching-out the transmission lines from a series connection with the second coupling line, and, an anode of the diode being connected to the RF choke and a negative bias potential being applied to the biasing element relative to the RF choke such that a DC bias current flows through the RF choke, the diode, the transmission line connected to the diode, and biasing element, the DC bias current switching the diode into a conducting state switching-out the transmission lines from a series connection with the second coupling line; and wherein the first and third blocking capacitors prevent the DC bias current from leaking to the directional couplers, the second blocking capacitor prevent a secondary DC path, and the DC blocking capacitors and the conducting diode providing AC coupling to the second coupling line, effectively bypassing the first and second transmission lines.

20. The switching module of claim 19, wherein the second blocking capacitor is shorted and a fourth capacitor is connected in series with the transmission line that is not connected to the diode, the fourth capacitor preventing a secondary DC path when the diode is biased to conduct.

21. The switching module of claim 19, wherein:
when the diode is connected to the third blocking capacitor the first blocking capacitor is shorted and a fourth capacitor is connected in series with the transmission line that is not connected to the diode, the fourth capacitor preventing a secondary DC path when the diode is biased to conduct, and when the diode is connected to the first blocking capacitor the third blocking capacitor is shorted and a fourth capacitor is connected in series with the transmission line that is not connected to the diode, the fourth capacitor preventing a secondary DC path when the diode is biased to conduct.

22. The switching module of claim 19, wherein at least one of the respective first and third blocking capacitors are shorted, DC signal blocking being provided outside of the switching module in at least one of the corresponding antenna and receiver.

23. The switching module of claim 17, further comprising a switched-in mode of the transmission lines wherein no bias potential is applied to the biasing element such that substantially minimal DC bias current flows such that the diode is in a substantially nonconducting state such that the first and third DC blocking capacitors AC electrically couple the first and second transmission lines in series with the second coupling line, thereby adding about a one-half electrical wavelength to the second coupling line.

24. The switching module of claim 17, further comprising four operating modes:
a first operating mode, wherein a signal from the input port is coupled to the antenna port, the first operating mode including the at least one transmission line being switched-out bypassing the at least one transmission line, a signal subsequently entering from the input port to the first coupler being divided by the first coupler to provide two signals to the first and second coupling lines with substantially no signal transmitted to the output port, the signals being substantially equal in magnitude and about 90° out of phase with the signal in the first coupling line leading the signal in the second coupling line by about 90° of phase, the signals in the first and second coupling lines traveling a substantially equal electrical length to the second coupler, the signal entering the second coupler from the first coupling line leading the signal entering the second coupler from the second coupling line by about 90° of phase such that the signals combine into a single signal coupled at the antenna port with substantially no signal present at the external port;

a second operating mode, wherein a signal from the input port is connected to the external port, the second operating mode including the at least one transmission line being switched-in to connect the at least one transmission line in a series connection with the second coupling line, a signal subsequently entering from the input port to first coupler being divided by the first coupler to provide two signals to the first and second coupling lines with substantially no signal transmitted to the output port, the signals leaving the first coupler being substantially equal in magnitude and about 90° out of phase with the signal in the first coupling line leading the signal in the second coupling line by about 90° of phase, the signal in the second coupling line traveling about an extra one-half wavelength through the at least one transmission line than the signal in the first coupling line, the signals entering the second coupler, being effectively reversed in phase with the signal in the second coupling line leading the signal in the first coupling line by about 90° of phase such that the signals combine into a single signal coupled at the external port with substantially no signal coming out of the antenna port;

a third operating mode, wherein a signal from the antenna port is connected to the output port, the third operating mode including the at least one transmission line being switched-in to connect the at least one transmission line in a series connection with the second coupling line, a signal subsequently entering from the antenna port to the second coupler being divided by the second coupler to provide two signals to the first and second coupling lines with substantially no signal transmitted to the external port, the signals leaving the second coupler being substantially equal in magnitude and about 90° out of phase with the signal in the second coupling line leading the signal in the first coupling line by about 90° of phase, the signal in the second coupling line traveling about an extra one-half wavelength through the at least one transmission line than the signal in the first coupling line, the signals entering the first coupler, being substantially reversed in phase with the signal in the first coupling line now leading the signal in the second coupling line by 90°, combine into a single signal coupled at the output port with substantially no signal coming out of the input port; and a fourth operating mode, wherein a signal from the external port is coupled to the output port, the fourth operating mode including the at least one transmission line being switched-out and bypassing the at least one transmission line, a signal subsequently entering from the external port to the second coupler being divided by the second coupler to provide two signals to the first and second coupling lines with substantially no signal transmitted to the antenna port, the signals being substantially equal in magnitude and about 90° out of phase with the signal in the first coupling line leading the signal in the second coupling line by about 90° of phase, the signals in the first and second coupling lines traveling a substantially equal electrical length to the first coupler, the signal entering the first coupler from the first coupling line leading the signal entering the first coupler from the second coupling line by about 90° of phase such that the signals combine into a single signal coupled at the output port with substantially no signal present at the input port.

25. A radio communication device having a switching module, the switching module comprising:

a first and second directional coupler, the first directional coupler having an input and output port, the second directional coupler having an antenna and external port;

a delay circuit having an electrical length of about one-half wavelength;

a first coupling line electrically connecting the couplers, a second coupling line electrically connecting the couplers, the delay circuit being switchably coupled in series with the second coupling line; and a switching circuit including a diode, a first, second and third DC blocking capacitor, a biasing element and a RF choke, the diode is connected in a series combination with the second DC blocking capacitor, the series combination is further connected in series with the second coupling line via the first and third DC blocking capacitors, the delay circuit is connected in parallel across the series combination, the RF choke is connected at a junction of the second blocking capacitor and the diode, the biasing element is coupled to the delay circuit;

the delay circuit, when switched into a series connection with the second coupling line by the switching circuit, adding substantially one-half electrical wavelength to the second coupling line, the delay circuit, when switched out of the series connection with the second coupling line by the switching circuit, subtracting substantially one-half electrical wavelength from the second coupling line.

* * * * *